(12) United States Patent
Meyer

(10) Patent No.: US 6,314,995 B1
(45) Date of Patent: Nov. 13, 2001

(54) FUEL TANK

(75) Inventor: Knut Meyer, Essen (DE)

(73) Assignee: Mannessmann VDO AG (DE)

( * ) Notice: Subject to any disclaimer, the term of this patent is extended or adjusted under 35 U.S.C. 154(b) by 0 days.

(21) Appl. No.: 09/674,016

(22) PCT Filed: Mar. 27, 1999

(86) PCT No.: PCT/EP99/02121
§ 371 Date: Nov. 29, 2000
§ 102(e) Date: Nov. 29, 2000

(87) PCT Pub. No.: WO99/55550
PCT Pub. Date: Nov. 4, 1999

(30) Foreign Application Priority Data

Mar. 27, 1999 (DE) .............................. 198 19 117

(51) Int. Cl.$^7$ .................................................. F02M 37/10
(52) U.S. Cl. ........................ 137/565.22; 137/565.24; 123/509; 123/514
(58) Field of Search ................ 137/565.22, 565.24; 123/509, 514

(56) References Cited

U.S. PATENT DOCUMENTS 5,170,764 * 12/1992 Tuckey ................................. 123/509
5,237,977 * 8/1993 Tuckey ................................. 123/510
5,669,359 * 9/1997 Kleppner et al. ..................... 123/509

FOREIGN PATENT DOCUMENTS

3915185C1   5/1989  (DE).
4123367A1   7/1991  (DE).
4426035A1   7/1994  (DE).
19544577A1  11/1995  (DE).

* cited by examiner

Primary Examiner—A. Michael Chambers
(74) Attorney, Agent, or Firm—Richard A. Speer; Mayer, Brown & Platt

(57) ABSTRACT

A fuel tank (1) has an ejector pump (9) arranged inside it. This ejector pump (9) is preloaded against an inner wall (10) of the fuel tank (1) by means of a flexurally elastic supporting arm (8) and is thus fixed. This allows the ejector pump (9) to be inserted into the interior of the fuel tank (1) without problems through an opening (3) together with a fuel feed unit (4). This considerably simplifies the fitting of the ejector pump (9) and, in particular, there is no need for another fitting opening in the fuel tank (1) to enable the ejector pump (9) to be fixed.

9 Claims, 3 Drawing Sheets

FUEL TANK

BACKGROUND OF THE INVENTION

The invention relates to a fuel tank with an ejector pump, which is arranged on an inner wall of the fuel tank and is connected to a fuel feed unit.

Ejector pumps of the above type are currently fitted in fuel tanks of today's motor vehicles and are therefore known. They are used to feed fuel from one chamber of the fuel tank to a second chamber via a feed line. The feed line is generally a hose extending into the second chamber and secured on the ejector pump, which is arranged in the fuel tank. Fuel flowing back from an injection system of the internal combustion engine via a return line is often used as a propellant for such ejector pumps.

The disadvantage with the known ejector pumps is that, with their feed line and the fuel feed unit, they form a fairly bulky component, a disadvantage that becomes apparent when it is being fitted in a fuel tank.

The known ejector pumps furthermore have a hold-down device that prevents the ejector pump from slipping in the fuel tank and fixes the ejector pump in its predetermined position. To insert the hold-down device, at least one further fitting opening must therefore be provided in the fuel tank. The disadvantage with this opening is the inevitably poorer permeation-tightness and the additional assembly work associated with the placement of a cover.

It would also be possible to consider placing the ejector pump in the interior of the fuel tank without fixing it. In this case, the ejector pump could move in a largely free manner under the effect of the backward and forward surging movement of the fuel, its freedom of motion being limited only by the feed line. The disadvantage here is that the ejector pump sliding along the inner wall of the fuel tank can damage its surface in the long term.

The problem underlying the invention is to configure a fuel tank of the type stated at the outset in such a way that the ejector pump can be fitted as simply as possible in the interior of the fuel tank. At the same time, the intention is, in particular, to dispense with a special fitting opening intended for a hold-down device and to be arranged in the fuel tank to fix the ejector pump in accordance with the prior art.

BRIEF SUMMARY OF THE INVENTION

According to the invention, this problem is solved by virtue of the fact that the ejector pump is preloaded against the inner wall of the fuel tank by means of a flexurally elastic supporting arm. This configuration makes it possible, during fitting, to introduce the ejector pump without problems and with an initially unstressed elongate supporting arm into the opening provided in the fuel tank for fitting the fuel feed unit. The supporting arm is then fixed in the interior of the fuel tank in such a way that the ejector pump is preloaded against the inner wall of the fuel tank and hence fixed in its position. There is therefore no need for an additional fitting opening for a hold-down device or other fixing means.

A particularly advantageous development of the invention is one in which the supporting arm is fixed on the fuel feed unit. For this purpose, the supporting arm can first of all be attached to the fuel feed unit and then inserted together with the latter into the fuel tank. By fixing the fuel feed unit in the interior of the fuel tank, the supporting arm and the ejector pump are also fixed at the same time. This makes it possible to reduce the work involved in assembly, and the elimination of the fixing means simultaneously reduces the number of components required.

Another particularly advantageous development of the invention is obtained if the supporting arm is fixed on a section of the inner wall of the fuel tank which is accessible through the opening for the fuel feed unit. As a result, the supporting arm can be of comparatively short construction, thus making it possible to increase the preloading force that can be transmitted by means of the supporting arm to press the ejector pump against the inner wall. For this purpose, the supporting arm can be fixed on the bottom of the fuel tank by means of a clip connection, for example. Here, the preferably releasable connection is situated in a section of the fuel tank adjoining the fuel feed unit.

A particularly advantageous development of the invention can also be achieved if the supporting arm is preloaded by means of a fixing means. This fixing means is introduced into the interior of the fuel tank through the opening provided for the insertion of the fuel feed unit and is connected to the connecting arm. The supporting arm can thereby be fixed at two different mounting points, making it possible to achieve a comparatively high contact force.

A particularly simple embodiment is obtained if the fixing means is a baffle. Such baffles, which are often used to prevent unwanted surging movements of the fuel in the interior of the fuel tank, can also be used at the same time to preload the supporting arm. Additional clamping means are therefore not required, thus further reducing the work involved in assembly.

The ejector pump preloaded against the inner wall of the fuel tank could be connected to a feed line embodied, for example, as a hose conduit, the feed line being passed freely through the interior of the fuel tank. On the other hand, an embodiment of the invention in which the feed line is connected to the supporting arm is particularly advantageous.

On the one hand, this means that the feed line is guided reliably in the interior, thereby making it possible to avoid damage caused by other fittings arranged in the interior of the fuel tank, and, on the other hand, it also simplifies fitting since the supporting arm can be inserted into the fuel tank together with the feed line.

It is particularly advantageous here if the feed line has a combined-flow line and a propellant flow line. As a result, the propellant-flow line required to operate the ejector pump can be mounted on the supporting arm together with the combined-flow line. The cross sections of the feed line and the supporting arm can be arranged in series or in a triangular form. The number of components for preassembly can thereby be increased and, at the same time, errors in final assembly can be largely excluded.

A development of the invention which is particularly suitable for preloading the supporting arm is one in which the supporting arm has a flexurally elastic wire. This wire, which is preferably manufactured from a corrosion-protected material, can be set optimally to a desired preloading force. At the same time, this embodiment of the supporting arm is economical to produce and can be used with only slight modifications with various types of fuel tank.

A particularly practical development is one in which the feed line is connected to the supporting arm by means of a clip connection. Here, the ejector pump can be to a large extent produced in advance together with the feed line and need then only be connected to the supporting arm by means of the clip connection. It is also possible here, for example, to have recourse to already available feed lines. It is also possible to use a plurality of clip connections, the feed line thus being connected to the supporting arm only at individual points.

Another embodiment of the invention which is of particularly simple design is one in which the supporting arm is embodied as a flexurally elastic feed line. This makes it possible to omit an additional wire. The feed line thus serves simultaneously as a feed line and as a supporting arm. No further components are required here.

Also particularly advantageous is an embodiment of the invention in which the supporting arm is aligned essentially parallel to a longitudinal axis of the vehicle. The surging of the fuel backward and forward in the interior of the fuel tank is caused essentially by the acceleration and braking of the vehicle. This gives rise to flow parallel to the longitudinal axis of the vehicle. The flow forces therefore act axially on the supporting arm, which is likewise arranged parallel to the longitudinal axis. As a result, the supporting arm can accept significantly higher forces than in the case of forces acting transversely thereto, in which case the supporting arm acts as a lever arm and the fixing of the supporting arm is subjected to a considerable load.

BRIEF DESCRIPTION OF THE DRAWINGS

The invention admits of various embodiments. A number of these are shown in the drawing to further illustrate its basic principle and are described below. In the drawing, in a diagrammatic representation:

FIG. 1 shows a fuel tank 1 according to the invention in a partially sectioned side view. The fuel tank 1 has an opening 3, which is closed by means of a cover 2 and through which a fuel feed unit 4 can be inserted into the interior of the fuel tank 1. The fuel feed unit 4 comprises an anti-surge cup 5 with a fuel pump 6 (illustrated only in broken lines) inserted into it. The fuel feed unit 4 carries a holding device 7, which is arranged on the outside of the anti-surge cup 5 and in which a flexurally elastic supporting arm 8 is clamped. By means of the supporting arm 8, an ejector pump 9 is preloaded out of an unstressed position (illustrated only in broken lines) against an inner wall 10 of the fuel tank 1, with the result that the supporting arm 8 is deflected. The flexurally elastic embodiment of the supporting arm 8 makes it possible to connect the fuel feed unit 4 to the supporting arm 8 outside the fuel tank 1 and insert them into the fuel tank 1 as a complete unit. Fixing the fuel feed unit 4 inside the fuel tank 1 simultaneously has the effect of preloading the supporting arm 8, thereby pressing the ejector pump 9 against the inner wall 10. For the sake of greater clarity, the connection elements connected to the ejector pump 9 are not shown.

FIG. 2 shows an embodiment of a fuel tank 11 in a partially sectioned side view, this embodiment being a modification compared with the fuel tank 1 illustrated in FIG. 1. Here, the essentially unchanged fuel feed unit 4 carries a holding device 12 of articulated design on the outside. In this arrangement, the supporting arm 8 holding the ejector pump 9 is preloaded against an inner wall 14 of the fuel tank 11 by means of a fixing means 13 embodied as a baffle. For this purpose, the fixing means 13 has a downwardly open aperture 15, so that the fixing means 13 can be placed on the supporting arm 8, initially inserted without stress, and preloads the latter. In this embodiment, the required loading on the supporting arm 8 therefore arises only from the insertion of the fixing means 13. This facilitates insertion of the fuel feed unit 4 through the opening 3, closed by means of the cover 2, and fixing of the anti-surge cup 5 on the inner wall 14 of the fuel tank 11. Here too, connection elements have not been shown for the sake of greater clarity.

FIG. 3 shows an embodiment of a fuel tank 16 that differs from the fuel tanks illustrated in FIGS. 1 and 2. In this embodiment, a supporting arm 17 is fixed on a lower section of an inner wall 18. By virtue of the comparatively short lever arm for flow forces acting on it, this shorter embodiment of the supporting arm 17 compared with the supporting arm described above makes it possible to produce a particularly high contact force with which to press the ejector pump against the inner wall 18. For this purpose, the supporting arm 17 holding the ejector pump 9 is secured on the inner wall 18 by means of a fixing means 19 embodied as a clip connection. The supporting arm 17 can therefore be inserted through the opening 3 into the interior of the fuel tank 16 independently of the fuel feed unit 4. A feed line 20 (illustrated only in broken lines) is passed through the interior of the fuel tank 16 to the anti-surge cup 5 of the fuel feed unit 4, with one section of the line being unsupported.

FIG. 4 shows part of a fuel tank 21, only part of which is shown, in an embodiment similar to that in FIG. 1. This figure serves to illustrate the principle involved and is therefore equally applicable to the embodiments shown in FIGS. 2 and 3. Here, the ejector pump 9 arranged on the flexurally elastic supporting arm 8 is preloaded against the inner wall 10, part of which is shown, with a preloading force $F_v$ by means of the holding flange 7 arranged on the anti-surge cup 5. In this arrangement, the supporting arm 8 has four clip connections 22, which are spaced apart at approximately uniform intervals and connect a feed line (not shown) to the supporting arm 8.

FIG. 5 shows a clip connection 22 of this kind in front view. Here, the clip connection 22 carries the feed line 20, which, in this exemplary embodiment, comprises a propellant flow line 23, which carries the fuel flow running back from the internal combustion engine of the vehicle, for example, to the ejector pump, and a combined-flow line 24, which is connected to the anti-surge cup (not shown). By means of the clip connection 22, the propellant flow line 23 and the combined-flow line 24 are connected to a supporting arm 25 embodied as a wire.

Figure 1:
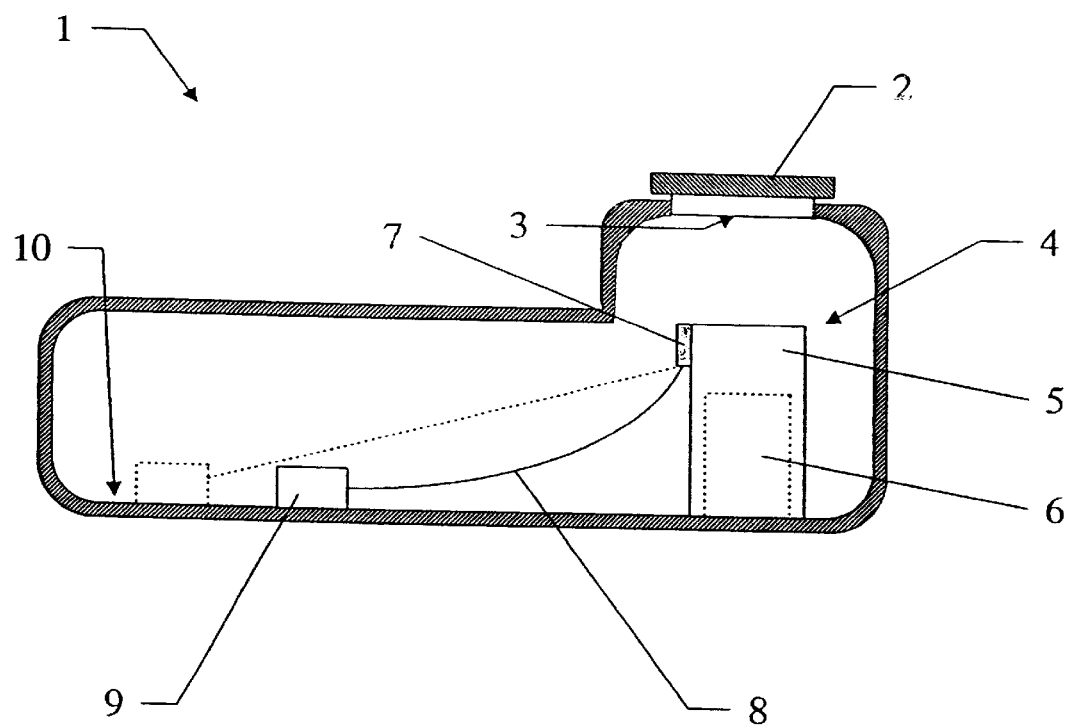
FIG. 1 shows a sectioned side view of a fuel tank according to the invention.
Figure 2:
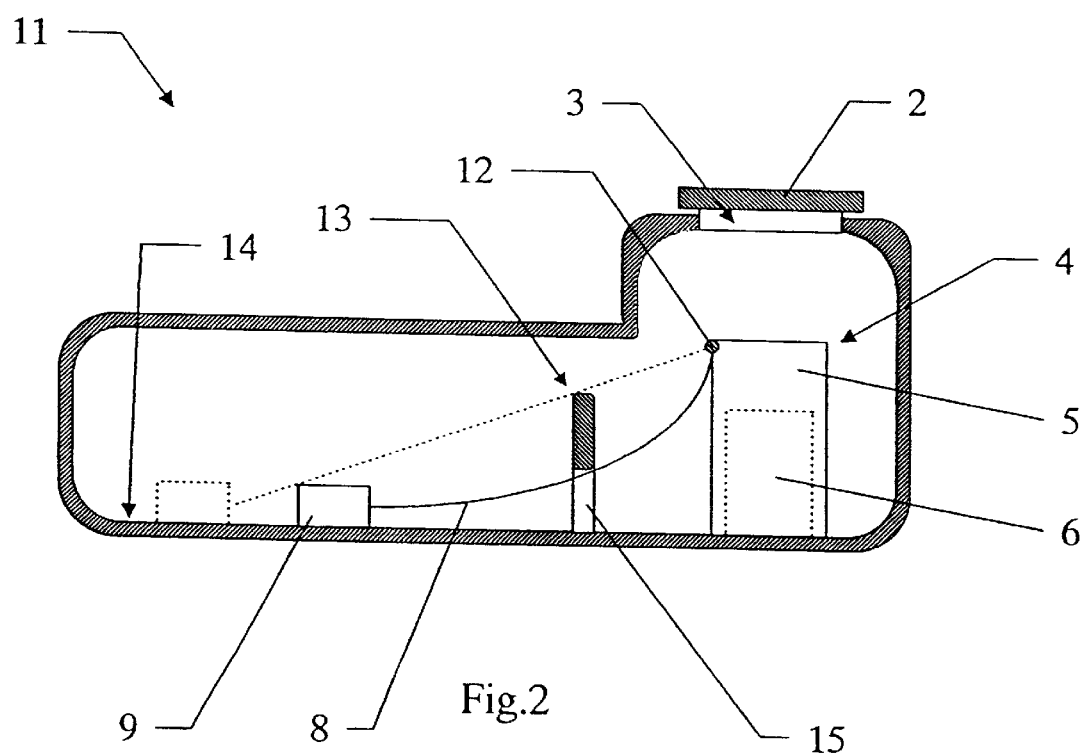
FIG. 2 shows another embodiment of a fuel tank with a baffle in a sectioned side view.
Figure 3:
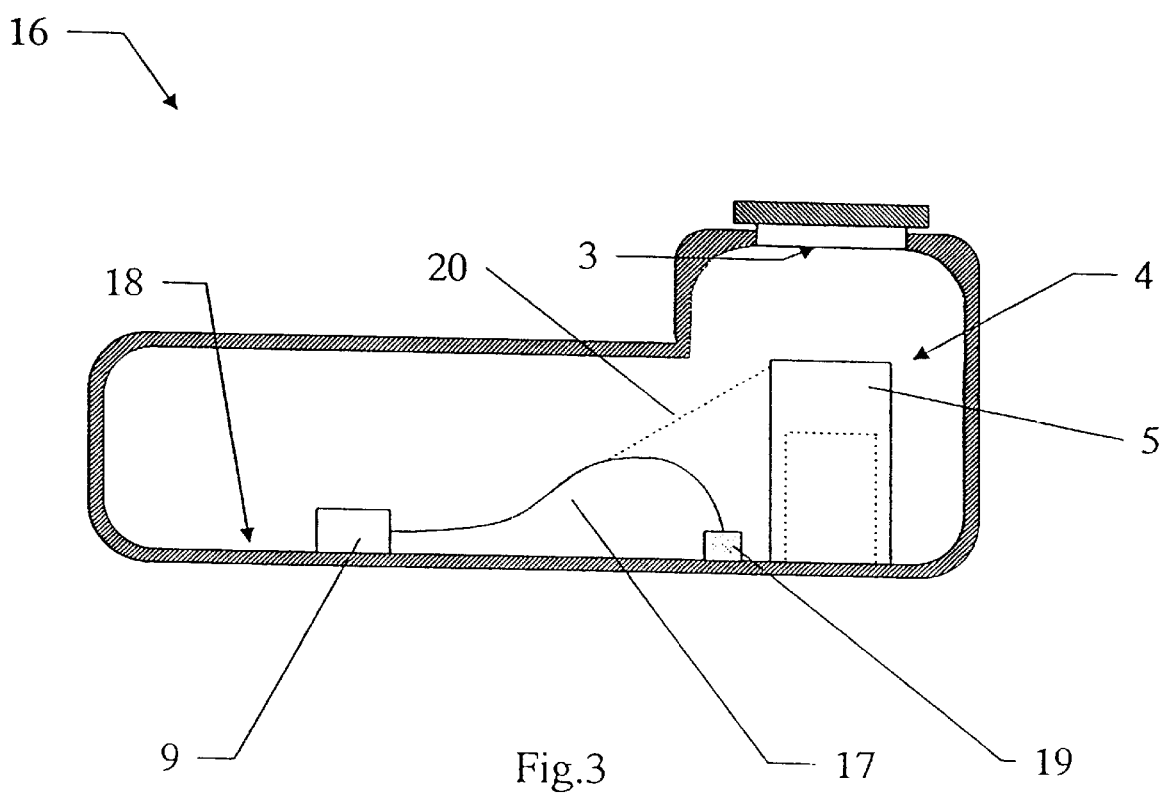
FIG. 3 shows another fuel tank with a supporting arm fixed thereon in a sectioned side view.
Figure 4:
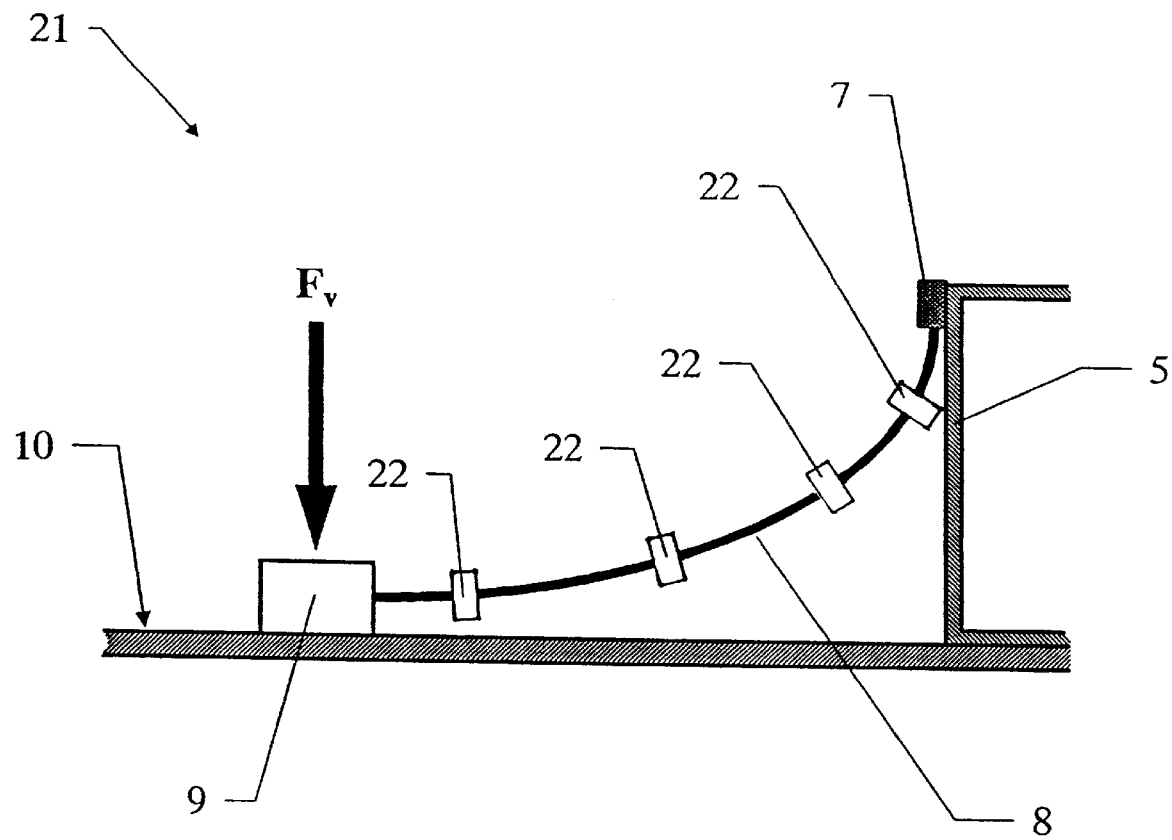
FIG. 4 shows part of a fuel tank with a supporting arm in a sectioned side view.
Figure 5:
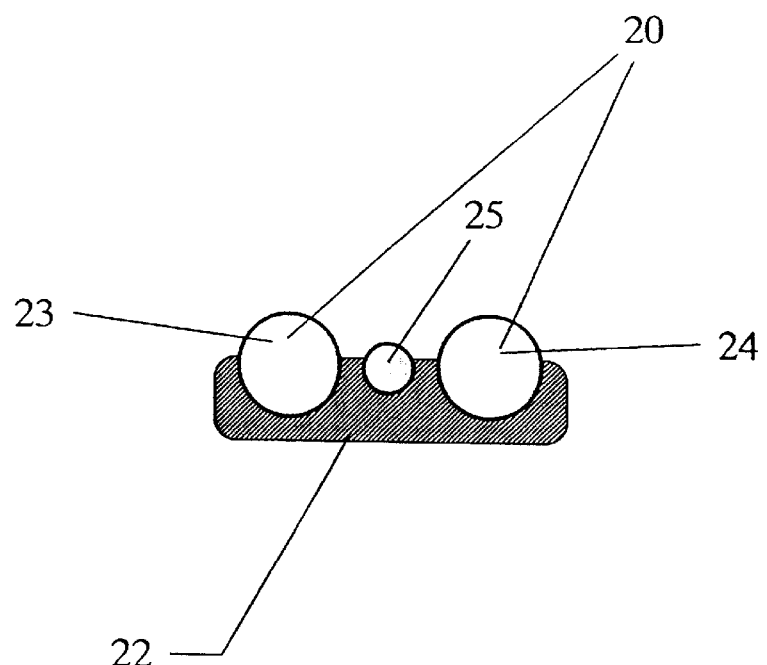
FIG. 5 shows a clip connection.

What is claimed is:

1. A vehicle fuel tank having an access opening through which both a fuel feed unit and an ejector pump can be mounted within the tank;
   a fuel feed unit mounted within the tank;
   an ejector pump connected to the fuel feed unit; and
   a flexurally supporting arm connected at one end to the ejector pump and at the other end to a fixed point within the tank to bias the ejector pump into contact with an inner wall of the tank, wherein the fixed point of connection and the fuel feed unit are accessible through the tank access opening.

2. A vehicle fuel tank having an access opening through which a fuel feed unit and an ejector pump can be mounted within the tank;

a fuel feed unit mounted within the tank;

an ejector pump connected to the fuel feed unit; and a flexurally elastic supporting arm connected at one end to the ejector pump and at the other end to the fuel feed unit to bias the ejector pump into contact with an inner wall of the tank.

3. The fuel tank as defined in claim 2, wherein the supporting arm is pre-loaded by a fixing means.

4. The fuel tank as defined in claim 3, wherein the fixing means is a baffle.

5. The fuel tank as defined in claim 2, wherein a fuel feed line is connected to the supporting arm.

6. The fuel tank as claimed in claim 5, wherein the fuel feed line has a fuel flow line and a propellant flow line.

7. The fuel tank as described in claim 5, wherein the fuse feed line is connected to the supporting arm by means of a clip connection.

8. The fuel tank as claimed in claim 2, wherein the supporting arm is a flexurally elastic fuel feed line.

9. The fuel tank as claimed in claim 2, wherein the supporting arm is aligned essentially parallel to a longitudinal axis of the vehicle.

* * * * *

UNITED STATES PATENT AND TRADEMARK OFFICE
CERTIFICATE OF CORRECTION

PATENT NO. : 6,314,995 B1
DATED : November 13, 2001
INVENTOR(S) : Knut Meyer

Page 1 of 1

It is certified that error appears in the above-identified patent and that said Letters Patent is hereby corrected as shown below:

<u>Column 6,</u>
Line 4, change "fuse" to -- fuel --.

Signed and Sealed this

Twenty-eighth Day of May, 2002

Attest:

JAMES E. ROGAN
*Attesting Officer*     *Director of the United States Patent and Trademark Office*